US010225754B2

(12) United States Patent
Tenny et al.

(10) Patent No.: US 10,225,754 B2
(45) Date of Patent: Mar. 5, 2019

(54) SYSTEM AND METHOD FOR A HUB DEVICE SEARCH

(71) Applicant: Futurewei Technologies, Inc., Plano, TX (US)

(72) Inventors: Nathan Edward Tenny, Poway, CA (US); Da Wang, Beijing (CN); Jian Wang, Beijing (CN); Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 233 days.

(21) Appl. No.: 14/971,797

(22) Filed: Dec. 16, 2015

(65) Prior Publication Data

US 2017/0181017 A1    Jun. 22, 2017

(51) Int. Cl.
*H04W 24/08* (2009.01)
*H04W 36/00* (2009.01)
*H04W 36/14* (2009.01)
*H04W 48/16* (2009.01)

(52) U.S. Cl.
CPC .......... *H04W 24/08* (2013.01); *H04W 36/03* (2018.08); *H04W 36/14* (2013.01); *H04W 48/16* (2013.01)

(58) Field of Classification Search
CPC .............................. H04W 24/08; H04W 48/16
See application file for complete search history.

(56) References Cited

U.S. PATENT DOCUMENTS

| 8,934,401 | B2 | 1/2015 | Speight et al. |
| 9,020,502 | B2 | 4/2015 | Das et al. |
| 9,699,817 | B2 * | 7/2017 | Ginnela .............. H04W 76/023 |
| 2008/0189970 | A1 * | 8/2008 | Wang ................ H04W 36/0055 33/701 |
| 2011/0117907 | A1 | 5/2011 | Hooli et al. |
| 2014/0219192 | A1 | 8/2014 | Yang et al. |
| 2015/0036663 | A1 * | 2/2015 | Kilpatrick, II ...... H04W 36/245 370/332 |
| 2015/0172387 | A1 | 6/2015 | Ge et al. |
| 2015/0223147 | A1 * | 8/2015 | Fujishiro ............... H04W 8/005 370/329 |

(Continued)

FOREIGN PATENT DOCUMENTS

| CN | 104333846 A | 2/2015 |
| EP | 2770791 A1 | 2/2014 |

(Continued)

OTHER PUBLICATIONS

"3rd Generation Partnership Project; Technical Specification Group Services and System Aspects; Feasibility Study on New Services and Markets Technology Enablers; Stage 1 (Release 14)," 3GPP TR 22.891, V1.0.0, Sep. 2015, 74 pgs.

(Continued)

*Primary Examiner* — Afshawn M Towfighi
(74) *Attorney, Agent, or Firm* — Slater Matsil, LLP

(57) ABSTRACT

A method includes determining a quality of service (QoS) of a direct link between an edge device and a communications controller and determining a hub search parameter in accordance with the QoS of the direct link between the edge device and the communications controller. The method also includes searching for hub devices in accordance with the hub search parameter.

21 Claims, 9 Drawing Sheets

(56) References Cited

U.S. PATENT DOCUMENTS

| | | | |
|---|---|---|---|
| 2015/0341974 A1 | 11/2015 | Wu et al. | |
| 2016/0212609 A1* | 7/2016 | Fujishiro | H04W 8/005 |
| 2016/0286564 A1* | 9/2016 | Berggren | H04W 72/085 |
| 2017/0208636 A1* | 7/2017 | Agiwal | H04W 76/023 |

FOREIGN PATENT DOCUMENTS

| | | |
|---|---|---|
| EP | 2739111 A2 | 6/2014 |
| WO | 2014098702 A1 | 6/2014 |

OTHER PUBLICATIONS

"3rd Generation Partnership Project; Technical Specification Group Services and System Aspects; Proximity-based services (ProSe); Stage 2 (Release 13)," 3GPP TS 23.303, V13.1.1, Sep. 2015, 116 pgs.

"3rd Generation Partnership Project; Technical Specification Group Radio Access Network; Mobility procedures for Home Node B (HNB); Overall description; Stage 2 (Release 11)," 3GPP TS 25.367, V11.1.0, Mar. 2013, 14 pgs.

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.7.0, Sep. 2015, 453 pgs.

Ericsson, "On D2D gaps," 3GPP TSG-RAN WG2 #90, Tdoc R2-153595, Beijing, P.R. China, Aug. 2015, 5 pgs.

TSG SA WG1, "TR 22.891 v.1.0.0 on New Services and Markets Technology Enablers (FS_SMARTER)," 3GPP TSG SA Meeting #69, SP-150542, Phoenix, Arizona, USA, Sep. 2015, 1 pg.

Das, S., et al., "CSG Proximity Detection Enhancement Using Out-of-band Radio of Home NodeB," 2012 4th International Congress on Ultra Modem Telecommunications and Control Systems and Workshops (ICUMT), Oct. 2012, 6 pgs.

Qualcomm Incorporated, "Enhanced LTE Device to Device Proximity Services," 3GPP TSG RAN meeting #69, RP-151337, Phoenix, USA, Sep. 2015, 14 pgs.

* cited by examiner

SYSTEM AND METHOD FOR A HUB DEVICE SEARCH

TECHNICAL FIELD

The present invention relates to a system and method for wireless communications, and, in particular, to a system and method for a hub device search.

BACKGROUND

In wireless networks, some classes of devices may be capable of direct communication with the wireless wide area network (WWAN), but also of lower-power, shorter-range communications with another device. Thus it may be beneficial for edge devices to use hub devices which may act as a proxy or relay to carry traffic between the edge device and the network, while facilitating that the edge device conserving battery power by using only a short-range link.

Also, some devices may lack WWAN capability entirely, or be out of coverage of the cellular network, and capable of contacting a suitable hub device through a device-to-device radio link. In these situations, the ability to relay traffic through the hub device facilitates that the edge device receives service from the network even though it cannot make direct radio contact.

In a network with many edge devices, there may be scaling problems associated with edge devices being independently connecting to the network. Also, the edge devices may have negative battery life effects from maintaining a WWAN connection. Because edge devices may be low powered devices, it is desirable for edge devices to conserve battery power when searching for a hub device.

In third generation partnership (3GPP) systems, the measurement procedures used by connected user equipments (UEs) is based on a framework, where the serving network provides a measurement configuration, which includes an indication of the resources to be measured. The measurement configuration may also provide a reservation of radio resources, for example compressed mode in universal mobile telecommunications systems (UMTS), to facilitate the UE performing searches and measurements towards objects that require retuning of the radio front end. This framework may be problematic for edge and hub devices.

The network may not be aware of the existence of hub devices in its coverage area, and may not be able to enumerate the hub devices as measurement objects in a measurement configuration for an edge device. When a hub device is known to the network, the network is unlikely to know in advance which edge device may be served by that particular hub device. Also, the availability and condition of links between a hub device and an edge device may not be known to the network. The links may use radio resources which were granted by the network for general device-to-device (D2D) use, for example under the proximity services (ProSe) framework. Configurations and radio conditions which are important to the searcher might not be available to the covering wide area network (WAN). The network is poorly positioned to understand the quality of service that the hub device is will offer the edge device. Although the network knows the channel conditions between the communications controller and the hub device, the network is not knowledgeable about the radio frequency (RF) environment between the hub device and the edge device. Low level interference may be negligible at the macro level but important for a low-power D2D link.

SUMMARY

An embodiment method includes determining a quality of service (QoS) of a direct link between an edge device and a communications controller and determining a hub search parameter in accordance with the QoS of the direct link between the edge device and the communications controller. The method also includes searching for hub devices in accordance with the hub search parameter.

An embodiment method includes receiving, by a network element from an edge device, a hub device report and determining whether to select a first hub device in accordance with the hub device report to produce a hub device response. The method also includes transmitting, by the network element to the edge device, the hub device response.

An embodiment method includes receiving, by a network element from an edge device, a measurement gap request for the edge device to search for hub devices and obtaining a hub device configuration. The method also includes determining a measurement gap response in accordance with the measurement gap request and the hub device configuration and transmitting, by the network element to the edge device, the measurement gap response.

An embodiment edge device includes a processor and a non-transitory computer readable storage medium storing programming for execution by the processor. The programming includes instructions to determine a quality of service (QoS) of a direct link between an edge device and a communications controller and determine a hub search parameter in accordance with the QoS of the direct link between the edge device and the communications controller. The programming also includes instructions to search for hub devices in accordance with the hub search parameter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
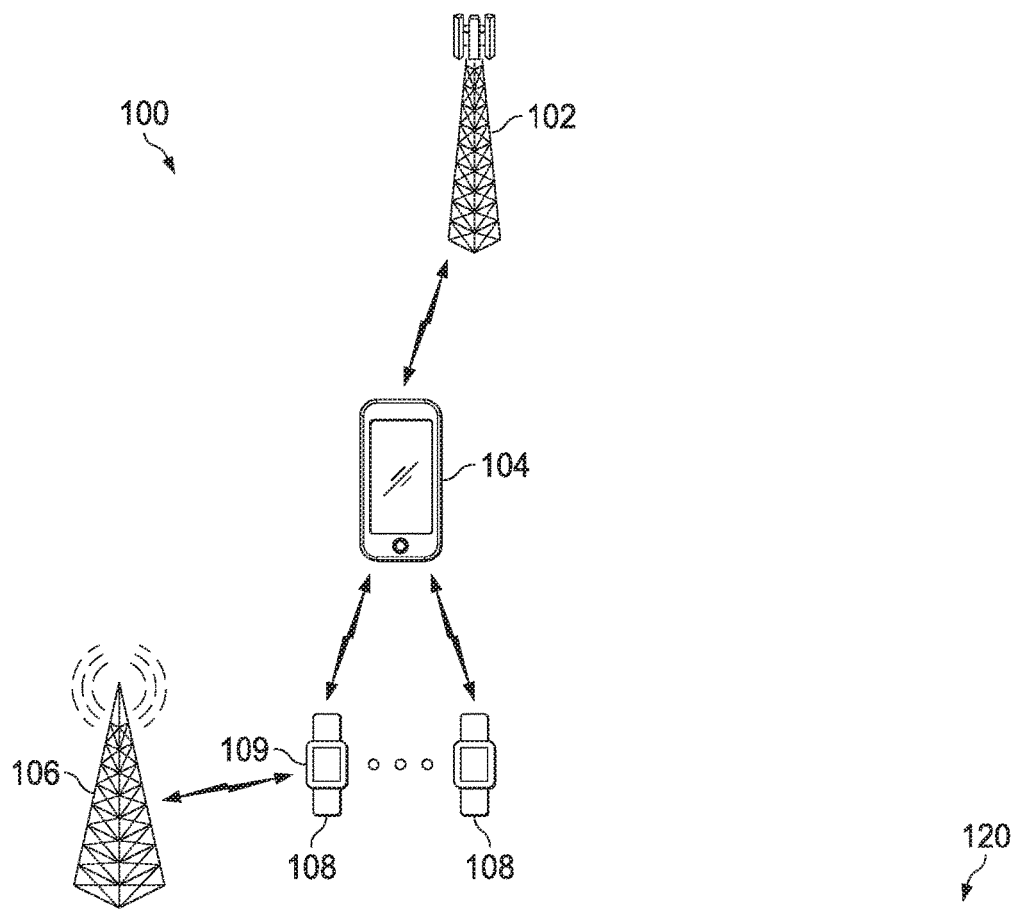
FIG. 1 illustrates a diagram of a wireless network for communicating data.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment network includes hub devices and edge devices in a hub and spokes model, where a single hub device connects to a wireless wide area network (WWAN), and spoke or edge devices connect to the network by proxy, using low-power, short-range connections for communication with the hub. Edge devices may access a wireless network directly or indirectly using a hub device. Also, edge devices which are in direct contact with the network may search for hub devices.

In an embodiment, the search for hub devices by an edge device is scheduled and managed, accounting for implementation-dependent heuristics for deciding when a hub device is likely to be nearby and available. When a hub device is discovered by an edge device, the service quality of a direct link to the network is compared to the service quality of an indirect link through the hub device. This comparison is used to determine whether to trigger a change in service path, for example from a direct link to an indirect link. Communication between the edge device and the network may be used to select a hub device. When the edge device uses measurement gaps to perform the search, a signaling exchange may be used to request measurement gaps from the network.

In an embodiment, an edge device detects a hub device aggressively when a direct link from the edge device is marginal or inadequate for the desired service while avoiding depleting battery power on aggressively searching for a hub device when the direct link is adequate. An embodiment minimizes disruptions to the direct link.

In an embodiment, the periodicity of a search for a discovery signal may be adjusted autonomously by an edge device. The periodicity may be based on or constrained by a variety of criteria which may be implementation specific, such as geographic position, detection of a proximity signal, such as a beacon, or information from the network. Link quality, as it pertains to quality of service (QoS), may be compared among various links to determine whether an indirect path through a hub provides better quality than a direct path to the network. In an embodiment, measurement gaps are requested by an edge device from a network. In another embodiment, the network is consulted for admission control and prioritization of one or more hubs.

In an embodiment, an edge device, such as a wearable device (WD) or a machine type communications (MTC) device, is in a direct connection with a network, but wants to search for a hub device which may provide an indirect connection to the network. The search periodicity may be adjusted based on a variety of factors, including expected proximity to a hub device and the quality of the direct link. A long search cycle provides a slow search while conserving power, while a short search cycle provides a quicker search while utilizing more power. A long search cycle may be used when an edge device does not expect a high probability of finding a hub device and the edge device has a good quality direct link.

In an embodiment, a user has both a smart watch and a smart phone. Each device has separate associated subscription with the subscriber's identity, such as an international mobile subscriber identity (IMSI). Both devices can independently communicate with a network. The smart watch is smaller, has a lower battery power capacity, and/or a lower baseband (BB) and radio frequency (RF) capability compared to the smart phone. When the smart watch moves into the coverage area of the smart phone, for example within a particular distance during an ongoing call from the smart watch, the smart watch becomes aware that it is in the coverage area of the smart phone. The call may be, for example, voice over long term evolution (VoLTE). The smart watch connects to the network through the smart phone using a third generation partnership (3GPP) system air interface between the smart watch and the smart phone. The smart watch maintains the call after connecting to the smart phone.

FIG. 1 illustrates network 100 for communicating data. Network 100 includes communications controller 102, which is connected to hub device 104, a relatively high-end UE. Communications controller 102 may be any component capable of providing wireless access by establishing uplink and/or downlink connections with hub devices 104, such as a base station, a NodeB, an enhanced nodeB (eNB), an access point, a picocell, a femtocell, relay node, and other wirelessly enabled devices. Hub device 104 may be a UE, such as any component capable of establishing a wireless connection with communications controller 102, such as cell phones, smart phones, tablets, sensors, etc. In another example, hub device 104 is an MTC gateway (GW). Hub device 104 is connected to edge devices 108, which may be wearable devices (WDs), MTC devices, or other lower power devices. The links between hub device 104 and edge devices 108 may be an air interface. WDs are clothing and accessories which incorporate computing and electronic technologies. WDs include activity trackers, smart watches, smart clothing, medical devices, smart glasses, and other wearable devices. MTC devices include in-vehicle devices, sensors, and other MTC devices. Edge devices 108 are indirectly connected to the network, such as a WWAN. Also, edge devices 108 may move between directly connecting to the network and indirectly connecting to the network using another UE. For example, edge device 109 is directly connected to the network via communications controller 106. The direct link may be an air interface between edge device 109 and communications controller 106.

Figure 2:
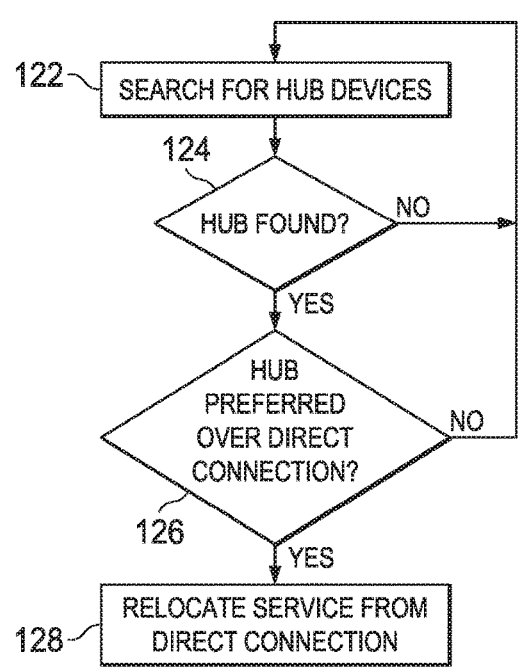
FIG. 2 illustrates a flowchart of an embodiment method of hub device searching.

FIG. 2 illustrates flowchart 120 for an embodiment method of selecting a direct or indirect network connection performed by an edge device. In step 122, an edge device which is directly connected to a network searches for hub devices. The edge device may broadcast a search message, for example periodically, with a fixed or variable frequency. The search period may be varied based on a variety of characteristics, such as the quality of the direct network connection and the likelihood of the edge device being near a hub device. In other examples, the broadcast message is triggered, for example by a poor or lost direct network connection. The discovery signals of the hub device may use measurement gaps. Too frequent searches waste battery power and may disrupt ongoing services, while too infrequent searches delays finding a hub device, and may waste battery in the long run from maintaining a sub-optimal connection.

Then, in step 124, the edge device determines whether a hub device has been found. When a hub device has not been found, the edge device returns to step 122 to continue searching for hub devices. On the other hand, when a hub device has been found, the edge device proceeds to step 126.

Next, in step 126, the edge device determines whether an indirect connection using the detected hub device is preferred over the existing direct connection. For example, the edge device may determine whether the indirect connection has a better QoS than the direct connection. When the indirect connection is not preferred over the direct connection, the edge device returns to step 122 to continue searching for hub devices. On the other hand, when the indirect connection is preferred over the direct connection, the edge device proceeds to step 128.

In step 128, the edge device transitions service from the direct connection to an indirect connection using the hub detected device.

When direct links and indirect links are handled by separate radio front ends, the search for hub devices is unlikely to disrupt communication over an existing direct link. However, when a radio front end already in use is redirected to search for hub devices, the search may involve measurement gaps. The edge device may stop receiving from the network to use the radio front end to search for hub devices. However, the network might not know to provide measurement gaps to an edge device that the network expects to have good channel conditions, even when the edge device might be better served with a different connection.

When no action is taken, an edge device that wants to tune away from the network to search for hub devices risks missing transmissions from the network. For some services such interruptions are acceptable. In other services, there may be natural gaps provided by a discontinuous connection (DRX) pattern, for example 19 ms gaps in a voice over internet protocol (VoIP) call. With other services, the edge device may use a mechanism to obtain measurement opportunities, for example by simulating link degradation. Alternatively, the edge device may send a request to the network for measurement gaps to search for hub devices.

In an example, edge devices use proximity signals, such as short-range radio access technologies (e.g. Bluetooth or near field communication (NFC)), geographic information (e.g. geographic position system (GPS) or a map of detected macrocells), or information negotiated through the service layer in determining parameters to search for hub devices. The edge device determines whether it is better to search more or less aggressively for hub device based on the parameters. Also, it is desirable for the edge device to minimize power and time of search when the direct link quality is already good.

Figure 3:
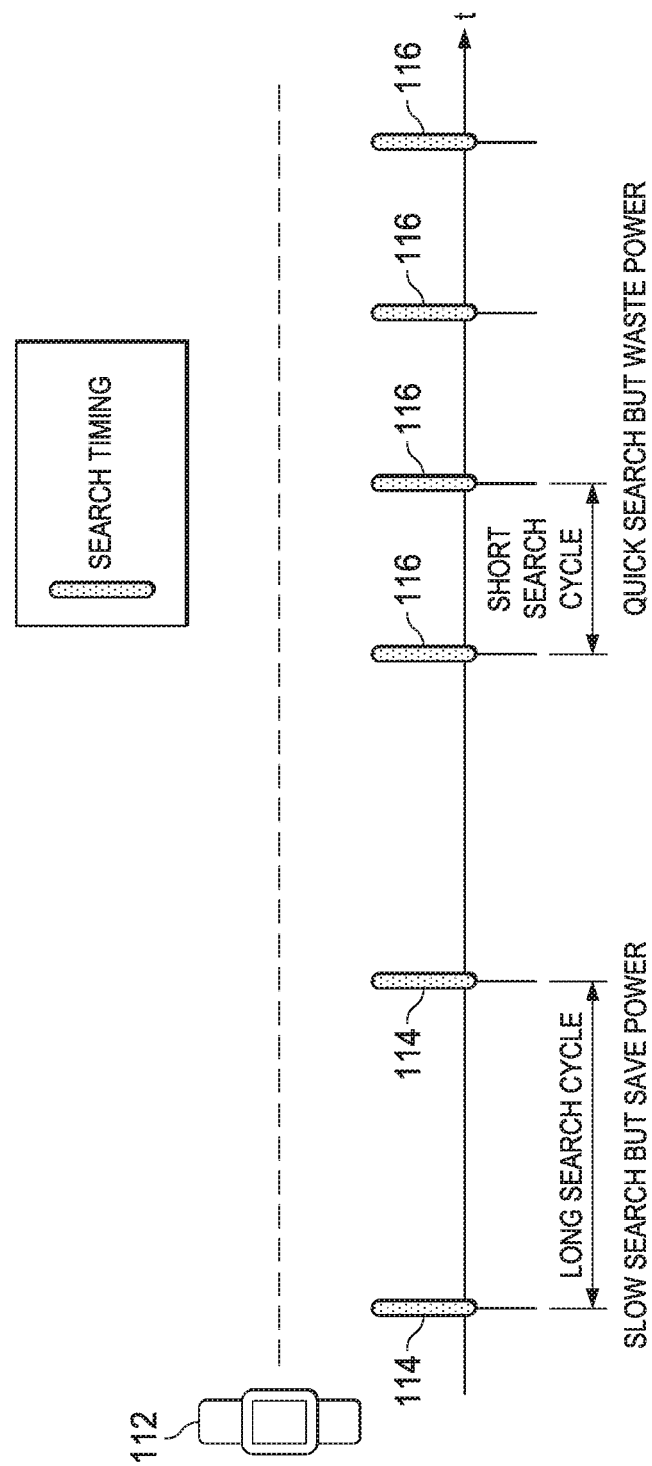
FIG. 3 illustrates long and short search cycles for hub device searching.

FIG. 3 illustrates long and short search cycles for edge devices searching for hub devices. Edge device 112, for example a WD, searches for hub devices while having a direct connection to the network. Edge device 112 may use long search cycle 114, which is a slow search that saves power. For example, long search cycle 114 may be used when no hubs are expected to be nearby and the direct link to the network is good. Long search cycle 114 may be performed in the background. In another circumstance, edge device 112 may use short search cycle 116, which is a quick search which may use significant power. Short search cycle 116 may be used when edge device 112 expects to be in close proximity of a hub device or has a poor direct link quality. The direct link quality may be evaluated using the QoS to the edge device. In one example, the edge device determines that the direct link is poor when the network persistently configures the edge device to use high power transmission. Edge device 112 may transition from long search cycle 114 to short search cycle 116, for example when the direct link quality degrades or the likelihood of proximity to a hub device increases. In another example, edge device 112 returns to long search cycle 114 when the battery is low. While edge device 112 is using short search cycle 116 and fails to find a hub device, it may gradually increase the search cycle ultimately returning to long search cycle 114 to conserve battery power.

Figure 4:
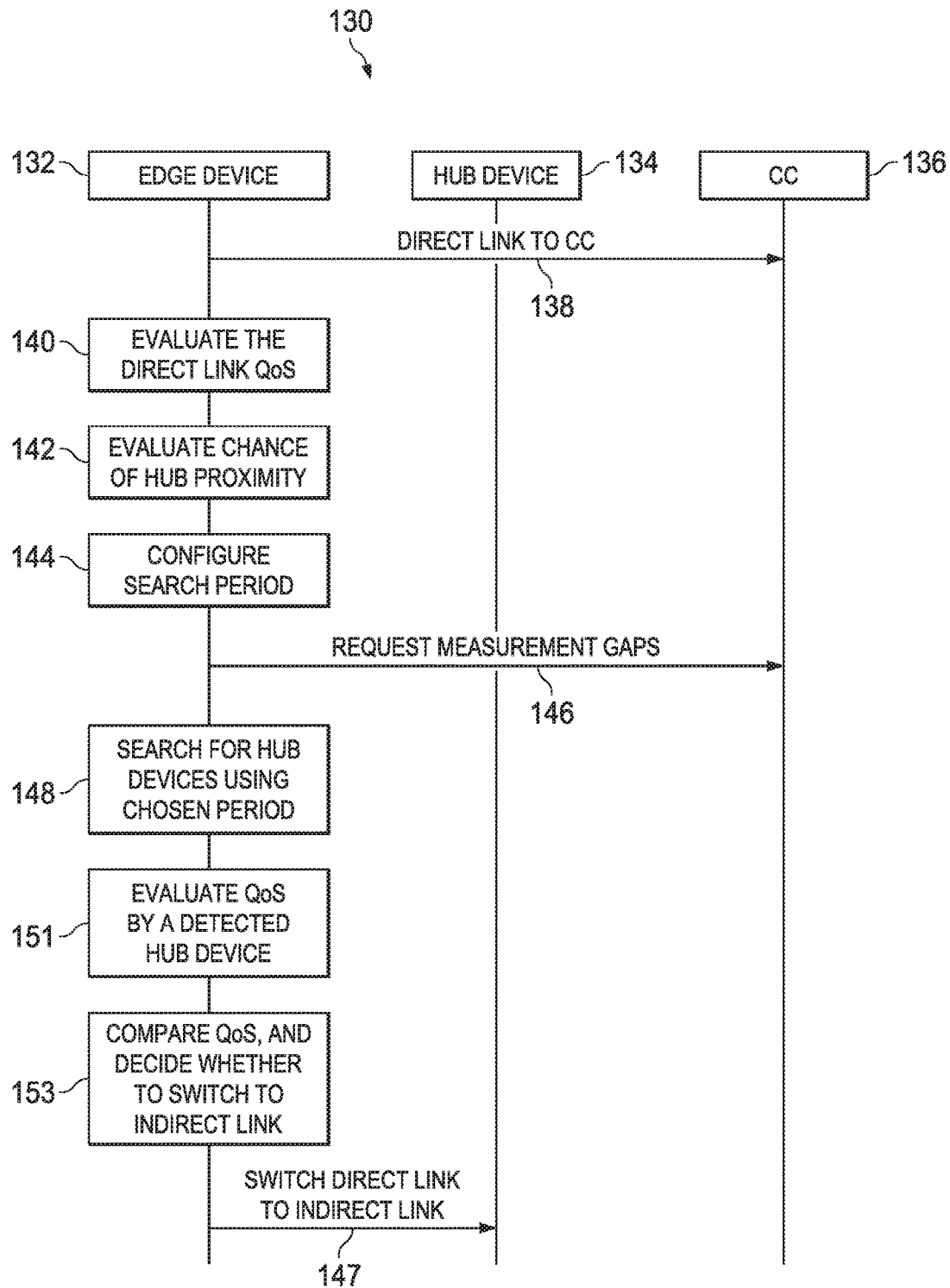
FIG. 4 illustrates a message diagram for an embodiment method of hub device searching.

FIG. 4 illustrates message diagram 130 for an embodiment method of searching for hub devices. The edge device configures the search parameters, for example search periodicity, based on the service level QoS of the current direct link and the likelihood of close proximity to a hub device. When the edge device finds a hub device, the edge device compares the direct link QoS and indirect link QoS to decide whether to switch the service path. Devices involved in message diagram 130 include the edge device 132, the hub device 134, and the communications controller (CC) 136.

In step 138, the edge device 132 has a direct link to the communications controller 136. The edge device 132 uses the direct link to communicate with the network through communications controller 136.

In step 140, the edge device 132 evaluates the QoS of the direct link through the communications controller 136 for service quality. For example, the service quality of the direct link may be classified as bad, marginal, or good. The bit rate and/or latency may be considered in determining the QoS. The power expended by the edge device 132 may be considered in determining the link quality. For example, a higher power expended may lead to a determination of a lower link quality.

In step 142, the edge device 132 evaluates the likelihood of being in close proximity with a hub device. The edge device 132 may use geographical location, for example from GPS or a map, in determining the likelihood of close proximity of a hub device, along with historical data. For example, the edge device may be more likely to be close to a hub device when near a particular home or office, and may be less likely to be close to a hub device when on a particular running route. Typical user behavior, like keeping a hub device in a pocket while wearing a WD, may be considered.

Other factors may be considered, such as the presence of a proximity signal, such as beacon signaling, which may be a high power zero content signal alert, for example from a femtocell. Also, the memory of previous search results may be considered.

In step 144, the edge device 132 configures the search period. The search period may be determined based on the direct link QoS determined in step 140 and/or the likelihood of hub device proximity determined in step 142. When the direct link quality is above a threshold or the likelihood of finding a hub device is below a threshold, the search for a hub device may have a low priority, and use a longer measurement periodicity. When the direct link quality is above the threshold and the likelihood of finding a hub device is above a threshold, the search for a hub device may have a high priority and hence a shorter measurement periodicity. The search period may have discrete priority levels. For example, there may be two, three, four, or more search periods. In another example, the search period may vary continuously.

In step 146, the edge device 132 requests measurement gaps from the communications controller 136. Measurement gaps may be requested using a message similar to InterFReqRSTDMeasurementIndication message in long term evolution (LTE) for observed time difference of arrival (OTDOA) positioning. In another example, messaging similar to that used for requesting gaps for proximity services (ProSe) discovery may be used. The search period determined in step 144 may be included in the measurement gaps request so the measurement gaps may be configured to coincide with the hub search messages. In some embodiments, step 146 is not performed.

In step 148, the edge device 132 searches for a hub device using the period configured in step 144. The measurement gaps requested in step 146 may be used. In another example, when measurement gaps are needed but not available, the edge device 132 tunes away to search at the risk of missing some downlink transmission.

When the edge device detects a hub device, the edge device 132 evaluates the QoS of the indirect link through the hub device in step 151. The bit rate, latency, and/or anticipated power expenditure may be used to determine the QoS of the indirect link.

Figure 5:
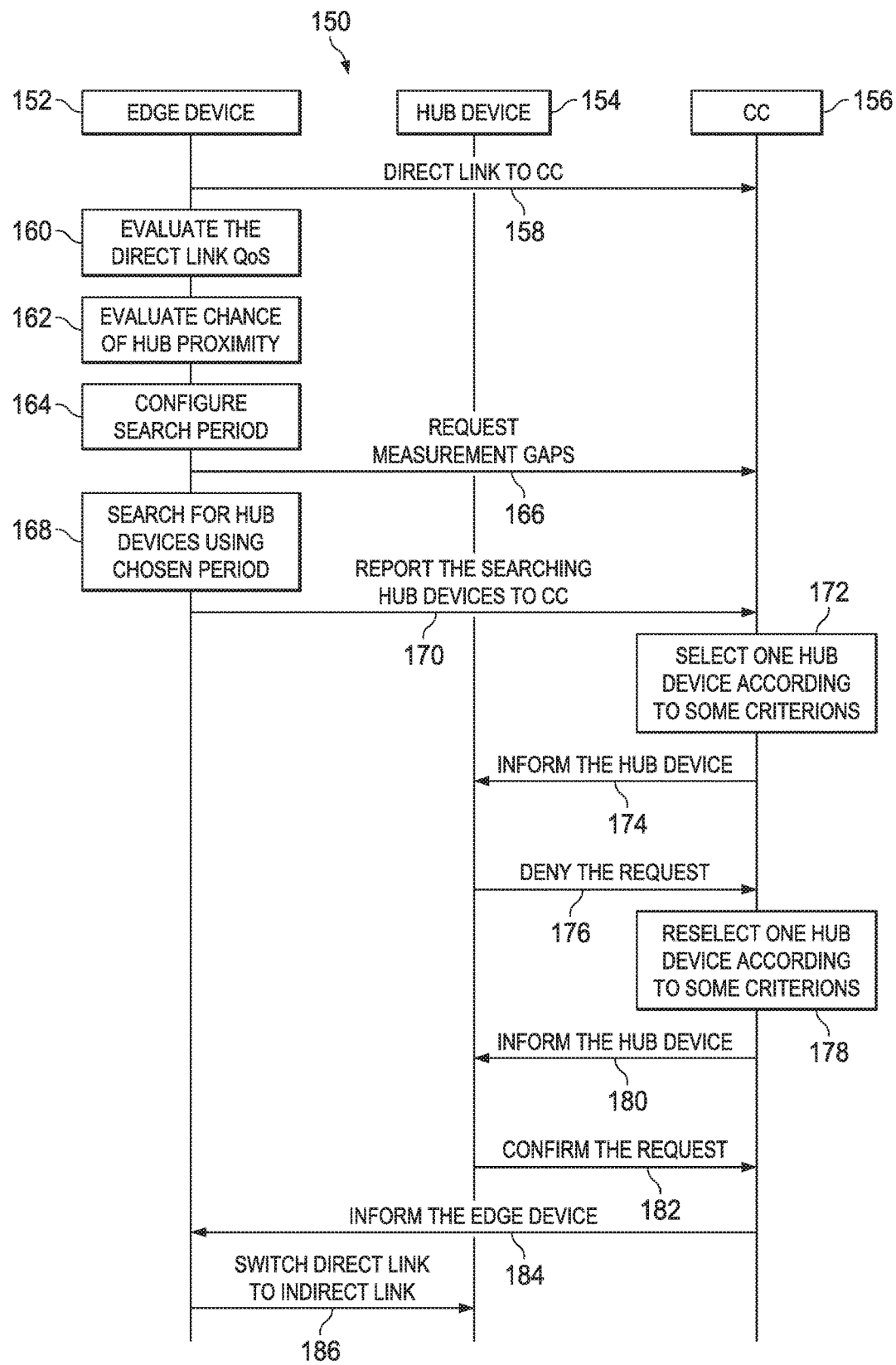
FIG. 5 illustrates a message diagram for another embodiment method of hub device searching.

In step 153, the edge device 132 compares the QoS of the direct link determined in step 140 to the QoS of the indirect link determined in step 151. Based on this comparison, the edge device 132 determines whether to transition from a direct link through communications controller 136 to an indirect link through hub device 134. When the edge device 132 decides to transition, the edge device 132 switches from a direct link to an indirect link in step 147. On the other hand, when the edge device 132 decides not to transition, the edge device 132 continues communicating with the communications controller 136 using the direct link. The edge device may continue searching for hub devices FIG. 5 illustrates message diagram 150 for another method of searching for hub devices. The signaling may be performed on different layers, depending on the network node that makes the decision. The edge device 152, the hub device 154, and the communications controller 156 perform the method in message diagram 150. In other embodiments, different network elements are used in place of a communications controller, such as a higher control-plane node, such as a mobility management entity (MME), or a server. The edge device configures the search parameters, such as search periodicity, based on the service level QoS of the current direct link and/or the expectation of being in close proximity to a hub device. When the edge device detects a hub device, the edge device compares the direct link QoS and indirect link QoS to decide whether to switch the service path.

In step 158, the edge device 152 communicates with the communications controller 136 using a direct link, which provides a QoS for the edge device 152. Edge device 152 uses the direct link to communicate with the network through communications controller 156.

In step 160, the edge device 152 evaluates the QoS of the direct link. The service quality of the direct link may be determined to be bad, marginal, or good. The bit rate and/or latency may be considered in determining the QoS. Also, the power expended by the edge device 152 may be considered in determining the link quality. For example, a higher power expended may lead to a determination of a lower link quality.

In step 162, the edge device 152 evaluates the likelihood of there being a hub device in close proximity. The edge device 152 may use geographical location, for example from GPS or a map, in determining the likelihood of close proximity of a hub device, which may be combined with historical data. For example, the edge device may be more likely to be close to a hub device when near a particular home or office, and may be less likely to be close to a hub device when on a particular running route. Typical user behavior, such as a particular user keeping a hub device in a pocket while wearing a WD, may be considered. Also, the presence of a proximity signal, such as beacon signaling, which may be a high power zero content signal alert, may be used. Additionally, the memory of previous search results may be considered.

In step 164, the edge device 152 configures the search period for the hub search. The search period may be configured based on the direct link QoS determined in step 160 and/or the likelihood of hub device proximity determined in step 162. When the direct link quality is above a threshold or the likelihood of finding a hub device is below a threshold, the search for a hub device may have a low priority, with a longer measurement periodicity. When the direct link quality is above the threshold and the likelihood of finding a hub device is above a threshold, the search for a hub device may have a high priority and a shorter measurement periodicity. The search period may have discrete priority levels. For example, there may be two, three, four, five, six, seven, eight, nine, ten, or more search periods. In another example, the search period may vary continuously.

In step 166, the edge device 152 optionally requests measurement gaps from the communications controller 156. In one example, measurement gaps may be requested using a message similar to InterFReqRSTDMeasurementIndication message in LTE for OTDOA positioning. In another example, messaging similar to that used for requesting gaps for ProSe discovery may be used. The search period determined in step 164 may be included in the measurement gaps message so the measurement gaps may be configured to coincide with the hub search messages.

In step 168, the edge device 152 searches for hub devices using the search period configured in step 164. The measurement gaps requested in step 166 may be used. In another example, when measurement gaps are needed but not available, the edge device 152 tunes away to search at the risk of missing some downlink transmissions.

In step 170, the edge device 152 reports the results of the hub device search in step 168 to the communications controller 156. The identities of hub device(s) detected may be transmitted. For example, the hub device identifiers (IDs) may be transmitted by the edge device 152 to the communications controller 156.

In step 172, the communications controller 156 selects one hub device from the hub search report received in step 170. A variety of criteria may be used to select a hub device. For example, a hub device may be selected based on belonging to the same user (for example, a smart watch and smart phone which belong to the same user), or based on the end-to-end (e2e) QoS of the indirect connection. When only one hub device is reported, the communications controller 156 may automatically select that hub device. The selected hub device is hub device 154.

In step 174, the communications controller informs the hub device 154 of its selection for edge device service as a hub device by transmitting a message. This may be in the form of a request that the hub device 154 serves as a hub device for the edge device 152.

The hub device may accept or reject the request to serve as a hub device. For example, the hub device may reject the request because of limited power. In step 176, the hub device rejects the request when it has decided to deny the request by transmitting a denial message to the communications controller 156.

When the communications controller 156 receives a message denying a request to be a hub device, the communications controller selects another hub device in step 178. The communications controller may select a hub device based on belonging to the same user or based on the e2e QoS of the indirect connection.

Then, in step 180, the communications controller 156 informs the hub device selected in step 178 by transmitting a message.

The hub device determines whether to accept this request. When the hub device decides to serve as a hub device, it transmits a confirmation message to the communications controller 156 in step 182.

In step 184, the communications controller transmits a message to the edge device 152 informing the edge device of the selected hub device which has confirmed that it will serve as a hub device.

In step 186, the edge device transitions from a direct link to the network through the communications controller 156 to an indirect link to the network through the hub device 154. The edge device 152 disconnects from the communications controller 156 and connects to the hub device 154.

The procedure illustrated in message diagram 150 may be performed when deciding between multiple potential devices or when only one potential hub device is found. The network can perform admission control for the indirect link. Also, the network can adjust billing based on the indirect link. For example, the network may reduce the billing to a device which acts as a hub device.

Figure 6:
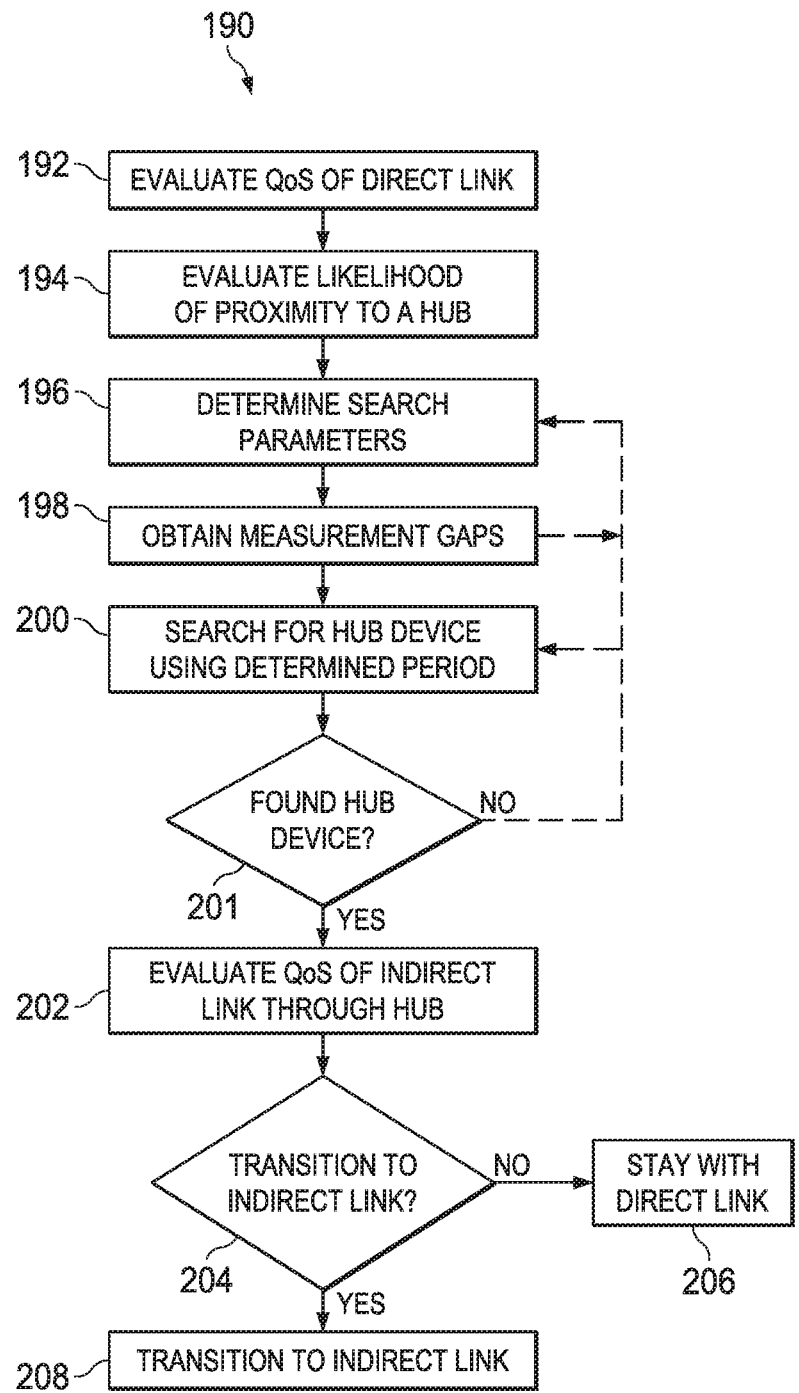
FIG. 6 illustrates a flowchart for an embodiment method of hub device searching performed by an edge device.

FIG. 6 illustrates flowchart 190 for a method of searching for hub devices performed by an edge device. Initially, the edge device has a direct link to a network, for example through a communications controller. In step 192, the edge device evaluates the QoS of the direct link, for example by evaluating a parameter assigned by the network for the operation of the direct link. The power expenditure of the edge device may be considered in determining the QoS of the direct link.

In step 194, the edge device evaluates the likelihood that the edge device is in close proximity to a hub device. Geographic position, the detection of a proximity signal, and historical data may be used to evaluate the likelihood of proximity to a hub device.

In step 196, the edge device determines search parameters for a hub search. The search parameters may include an interval between instances of search activity, a duration of an instance of search activity, a set of radio resources to which the search is directed, a determination of idle periods to perform the search, and/or a priority level for the search. This search parameter may depend on the direct link QoS determined in step 192 and/or the likelihood of proximity to a hub determined in step 194. Also, the search parameter may depend on whether measurement gaps have been granted by the network. In another example, the search parameter depends on an anticipated pattern of data delivery to the edge device from the network. The anticipated pattern may be based on a configured discontinuous reception (DRX) cycle. For example, the search period may be short when the direct link QoS is low or the likelihood of hub device proximity is low. A short search period may be set, and, while the edge device fails to detect a hub device, the search period may be gradually increased.

In step 198, the edge device optionally obtains measurement gaps. The measurement gaps are idle periods for the edge device to perform the search for the hub devices. The requested measurement gaps may be based on the likelihood of proximity to a hub device determined in step 194. The edge device may transmit a message to the communications controller requesting measurement gaps for searching for the hub device. This message may be a radio resource control (RRC) message. Also, the message may indicate a requested configuration for the idle periods. In response, the edge device receives a message from the communications controller granting (or not granting) the requested measurement gaps. In one example, when the measurement gaps are not granted, the edge device returns to step 196 to adjust the search parameter.

In step 200, the edge device searches for a hub device using the parameters determined in step 196. The edge device broadcasts a message searching for a hub device in accordance with the determined search parameters.

In step 201, the edge device determines whether a hub device has been detected. When a hub device has been detected, the edge device proceeds to step 202. When a hub device has not been detected, the edge device may return to step 196 to re-evaluate the search parameters. In another example, when a hub device has not been detected, the edge device returns to step 200 to continue searching for hub devices without re-evaluating the search parameters.

In step 202, the edge device evaluates the QoS of the indirect link to the network through the detected hub device. This may be the end-to-end link of the network connection.

In step 204, the edge device determines whether to switch from a direct link to an indirect link. The edge device may compare the QoS of the direct link determined in step 192 to the QoS of the indirect link determined in step 202. When the QoS of the indirect link is higher than the QoS of the direct link, the edge device may decide to transition to the indirect link, and when the QoS of the direct link is higher or equal to the QoS of the indirect link, the edge device may stay on the direct link. When the edge device decides to switch to the indirect link, it proceeds to step 208 to transition to the indirect link. The edge device disconnects from the communications controller, and connects to the hub device. On the other hand, when the edge device decides not to switch links, it proceeds to step 206 to stay on the direct link.

Figure 7:
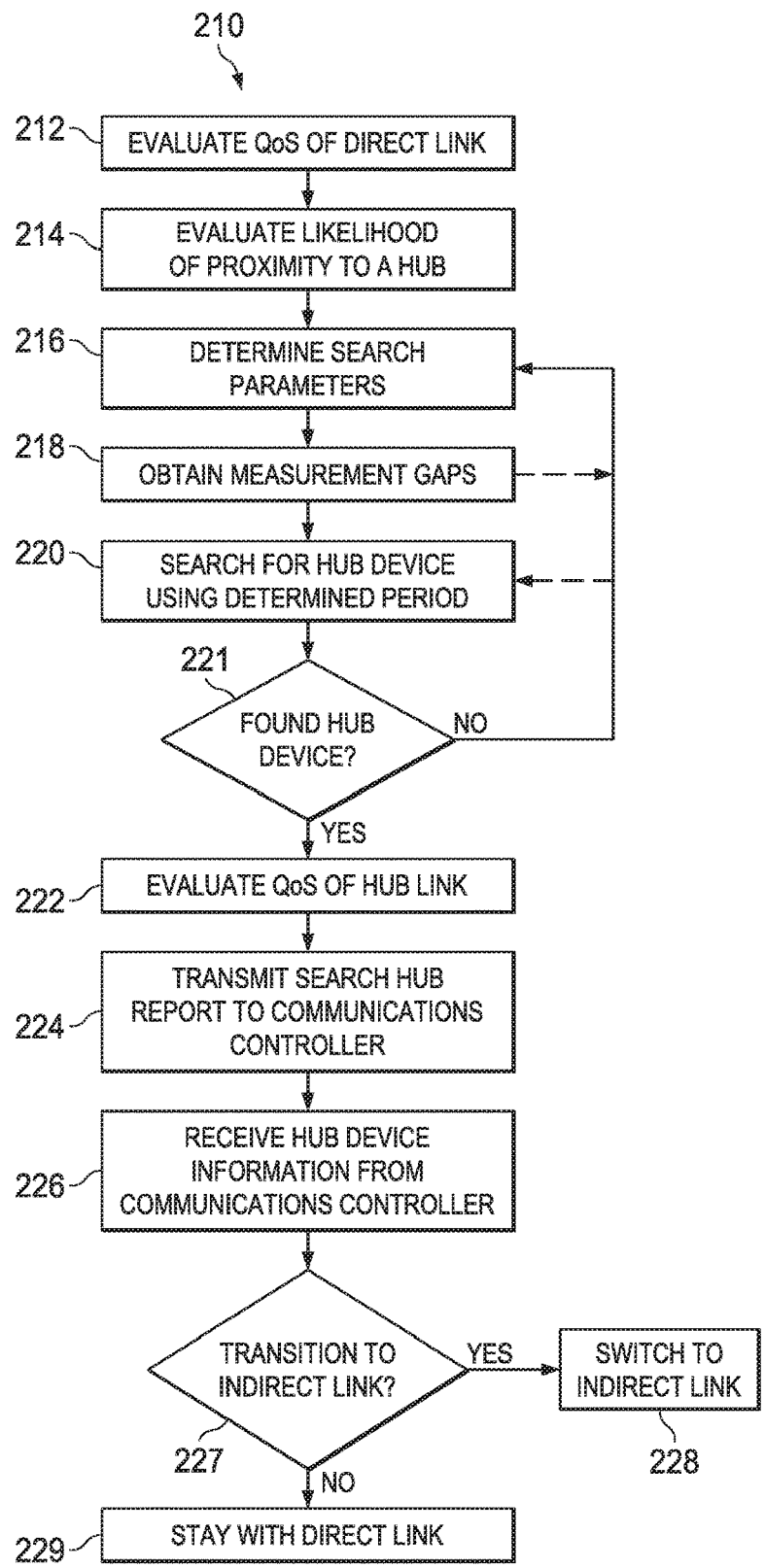
FIG. 7 illustrates a flowchart for another embodiment method of hub device searching performed by an edge device.

FIG. 7 illustrates flowchart 210 for another embodiment method of for hub device searching performed by an edge device. The edge device has a direct link to a network through a communications controller. In step 212, the edge device evaluates the QoS of the direct link, for example by evaluating a parameter assigned by the network for the operation of the direct link. The power expenditure of the edge device may be considered in determining the QoS of the direct link.

In step 214, the edge device evaluates the likelihood that the edge device is in close proximity to a hub device. Geographic position, the detection of a proximity signal, and historical data may be used to evaluate the likelihood of proximity to a hub device.

In step 216, the edge device determines search parameters for a hub search. The search parameters may include an interval between instances of search activity, a duration of an instance of search activity, a set of radio resources to which the search is directed, a determination of idle periods to perform the search, or a priority level for the search. The search parameters may depend on the likelihood of proximity to a hub determined in step 214 and/or the direct link QoS determined in step 212. Also, the search parameter may depend on whether measurement gaps have been granted by the network. In another example, the search parameter depends on an anticipated pattern of data delivery to the edge device from the network. The anticipated pattern may be based on a configured DRX cycle. In one example, the search period may be short when the direct link QoS is low or the likelihood of hub device proximity is low. A short search period may be determined, and, the longer that the edge device fails to detect a hub device, the search period may be gradually increased.

In step 218, the edge device optionally obtains measurement gaps. The measurement gaps are idle periods of service for the edge device to perform the search for the hub devices. The requested measurement gaps may be based on the likelihood of proximity to a hub device determined in step 214. The edge device may transmit a message to the communications controller requesting measurement gaps for searching for the hub device, for example an RRC message. Also, the message may indicate a requested configuration for the idle periods. In response, the edge device receives a message from the communications controller granting (or not granting) the requested measurement gaps. In one example, when the measurement gaps are not granted, or are granted for different search timing than requested, the edge device returns to step 216 to reconfigure the search parameters.

In step 220, the edge device searches for a hub device using the parameters determined in step 196. The edge device broadcasts a message searching for hub devices based on the search parameters.

In step 221, the edge device determines whether a hub device has been detected. When a hub device has been detected, the edge device proceeds to step 222. In one example, when a hub device has not been detected, the edge device returns to step 220 to continue searching for a hub device without re-evaluating the search parameters. In another example, when a hub device has not been detected, the edge device returns to step 216 to re-evaluate the search parameters.

In step 222, the edge device evaluates the QoS of the indirect link to the network through the hub device. This may be the end-to-end link of the network connection.

In step 224, the edge device transmits a hub device report to the communications controller, for example a list of hub device(s), such as a list of hub device IDs. One, two, or more hub devices may be detected. The hub device report may be evaluated by the communications controller, or by another network element.

In step 226, the edge device receives hub device information from the communications controller. For example, the edge device may receive the hub device ID of the selected hub device. When the network determines that the edge device should stay on the existing direct link, the hub device information indicates so.

Then, in step 227, the edge device determines whether to transition to an indirect link from a direct link based on the message received in step 226. When the edge device decides not to switch to an indirect link, it proceeds to step 229 to remain on the direct link. On the other hand, when the edge device decides to switch to an indirect link, the edge device proceeds to step 228. In step 228, the edge device transitions from a direct link to an indirect link using the hub indicated in step 226. The edge device disconnects from the communications controller, and connects to the hub device.

Figure 8:
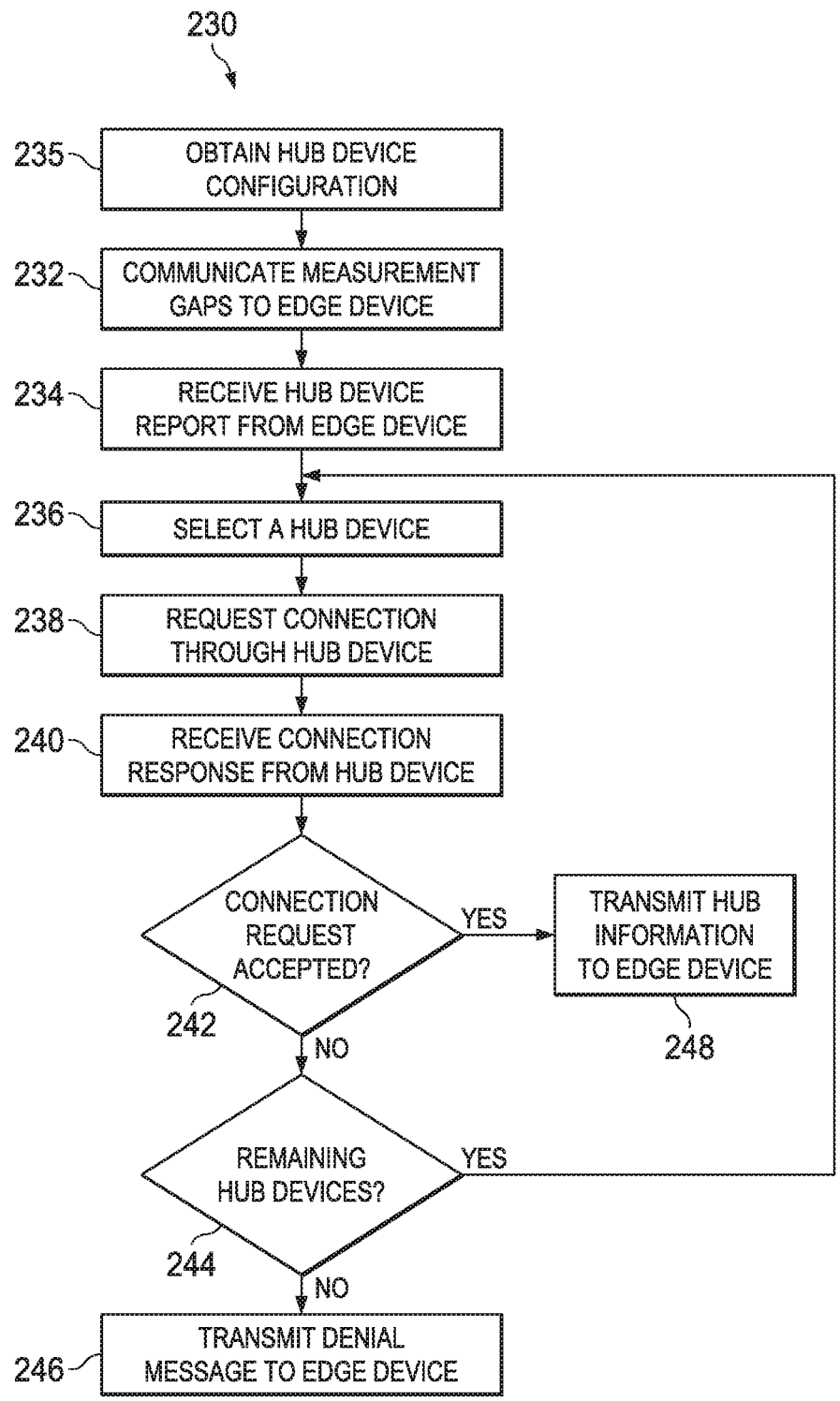
FIG. 8 illustrates a flowchart for an embodiment method of hub device searching performed by a network element.

FIG. 8 illustrates flowchart 230 for an embodiment method of searching for hub devices performed by a network element. The method may be performed by a communications controller, a higher control-plane node, such as an MME, or another network element, such as a server.

In step 235, the network element obtains configuration information for one or more potential hub devices, for example over an air interface. In one example, the network element receives a message from a hub device indicating the configuration information. In another example, the network element receives a message from a wireless device which is not the hub device, or from an application server. The configuration information may be based on a service delivered to the hub device.

In step 232, the network element communicates measurement gaps to an edge device. The measurement gaps may be determined based on the hub device characteristics obtained in step 235. The network element may receive a request for measurement gaps from the edge device. The network element then determines whether to grant the measurement gaps. The configuration of the measurement gap pattern may be based on a configuration of a hub device. In one example, the configuration of the measurement gap pattern is based on a parameter, for example a timing parameter for hub searching. The timing parameter may be a start time of a measurement gap and/or duration of a measurement gap. The network element transmits a response to the edge device. The response may include the measurement gap pattern. The measurement gap pattern may include one, two, three, four, or more measurement gaps, for example unlimited measurement gaps. In another example, the measurement gap pattern may include a time between measurement gaps, duration of the measurement gap pattern, and/or a number of gaps in the measurement gap pattern. In some examples, steps 232 and 235 are not performed.

In step 234, the network element receives a hub device report from the edge device. The hub device report may be a list of detected hub devices. For example, the network element may receive a list of hub device IDs. The list may include one, two, three, four, or more potential hub devices.

Next, in step 236, the network element selects a hub device based on the hub device report received in step 234. The network element may consider the hub configuration information received in step 235 in selecting a hub device. The network element may select a hub device based on the expected end-to-end QoS of indirect connections through the hub device. In another example, the network element selects a hub device which is owned by the same user as the edge device.

Then, in step 238, the network element requests that the hub device selected in step 236 serve as a hub device for the edge device. The network element transmits a message to the hub device requesting an indirect connection for the edge device through the hub device.

In response, in step 240, the network element receives a connection response from the hub device. The connection response indicates whether the hub device accepts serving as a hub device for the edge device.

Next, in step 242, the network element determines whether the connection request has been accepted by the hub device based on the message received in step 240. When the network element determines that the hub device has accepted the connection request, the network element proceeds to step 248. On the other hand, when the network element determines that the hub device has not accepted serving as a hub device, the network element proceeds to step 244.

In step 248, the network element transmits information on the hub device to the edge device. For example, the network element transmits the hub device ID to the edge device.

In step 244, the network element determines whether there are remaining potential hub devices on the list of potential hub devices. When there are remaining hub devices, the network element returns to step 236 to select another hub device, and when there are no remaining potential hub devices, the network element proceeds to step 246 to transmit a message to the edge device indicating that the edge device should remain on the direct connection.

Figure 9:
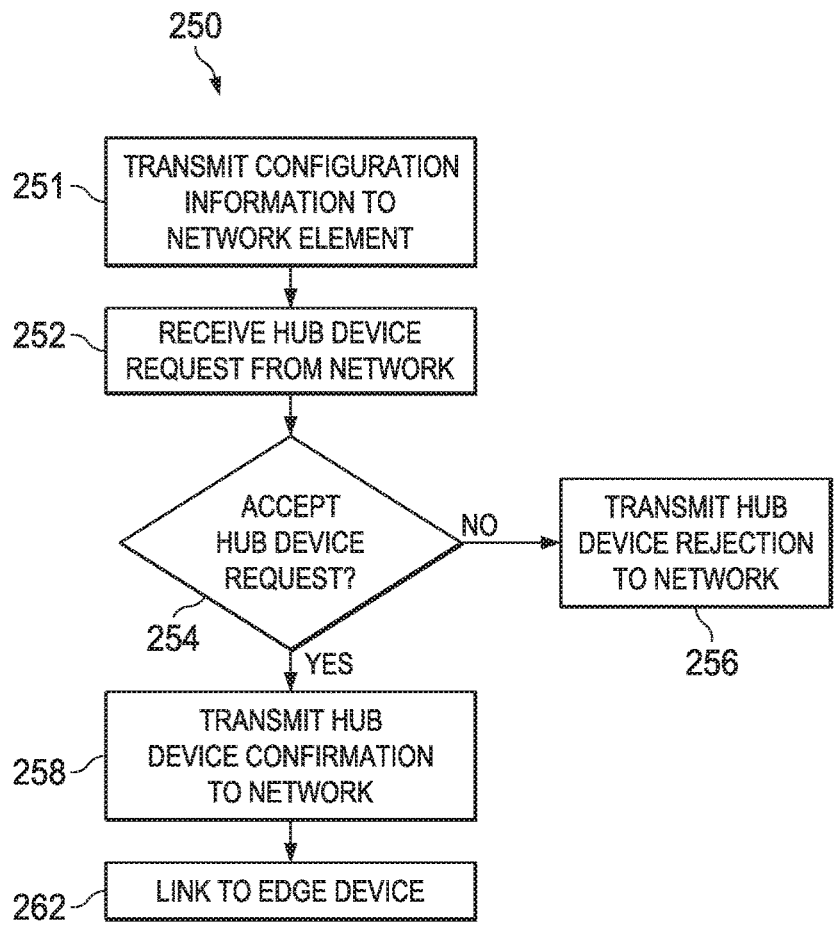
FIG. 9 illustrates a flowchart for an embodiment method of hub device searching performed by a hub device.

FIG. 9 illustrates flowchart 250 for an embodiment method of hub device selection performed by a potential hub device. In step 251, the hub device transmits configuration information to a network element. The configuration information may be based on a service delivered to the hub device. In some examples, step 251 is not performed.

In step 252, the hub device receives a hub device request to serve as a hub device from a network element.

Then, in step 254, the hub device determines whether to accept the hub device request. The hub device may decide not to serve as a hub device, for example when it is bandwidth limited. The hub device may consider pricing incentives, for example a credit for serving as a hub device, in determining whether to serve as a hub device. When the hub device decides not to serve as a hub device, it proceeds to step 256, and transmits a message to the network rejecting the request to serve as a hub device. On the other hand, when the hub device decides to serve as a hub device, it proceeds to step 258 and transmits a message to the network accepting the hub device request. Then, the hub device links to the edge device in step 262.

Figure 10:
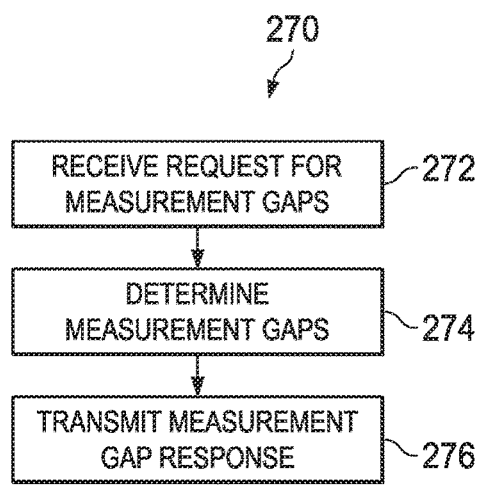
FIG. 10 illustrates a flowchart for an embodiment method of setting measurement gaps performed by a network element.

FIG. 10 illustrates flowchart 270 for an embodiment method of determining measurement gaps performed by a network element. In step 272, the network element receives a request for measurement gaps from an edge device.

In step 274, the network element then determines whether to grant the measurement gaps, and if so, in what measurement gap pattern. The configuration of the measurement gap pattern may be based on a configuration of a potential hub device. In one example, the configuration of the measurement gap pattern is based on a parameter, for example a timing parameter. The timing parameter may be a start time of a measurement gap and/or duration of a measurement gap.

In step 276, the network element transmits a measurement gap response to the edge device. The measurement gap response may include the measurement gap pattern. The measurement gap pattern may include one, two, three, four, or more measurement gaps. In another example, the measurement gap pattern may include a time between measurement gaps, duration of the measurement gap pattern, and/or a number of gaps in the measurement gap pattern.

Figure 11:
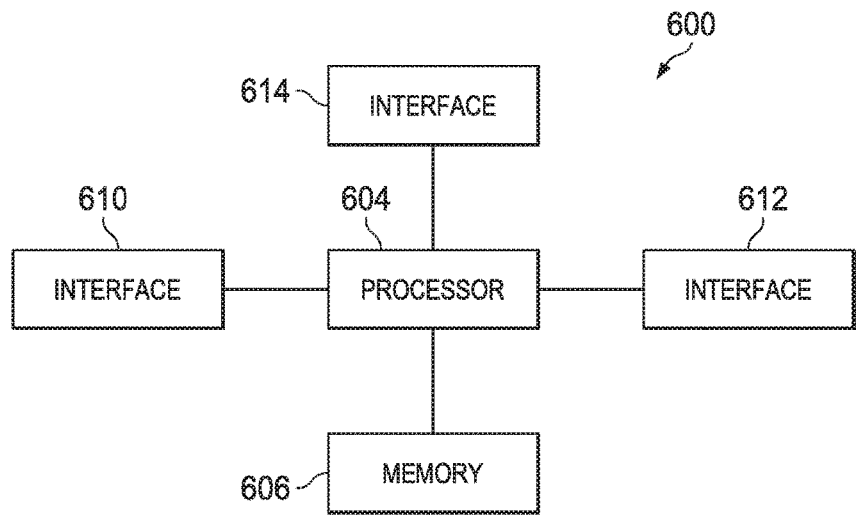
FIG. 11 illustrates a block diagram of an embodiment processing system.

FIG. 11 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 11. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 11, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
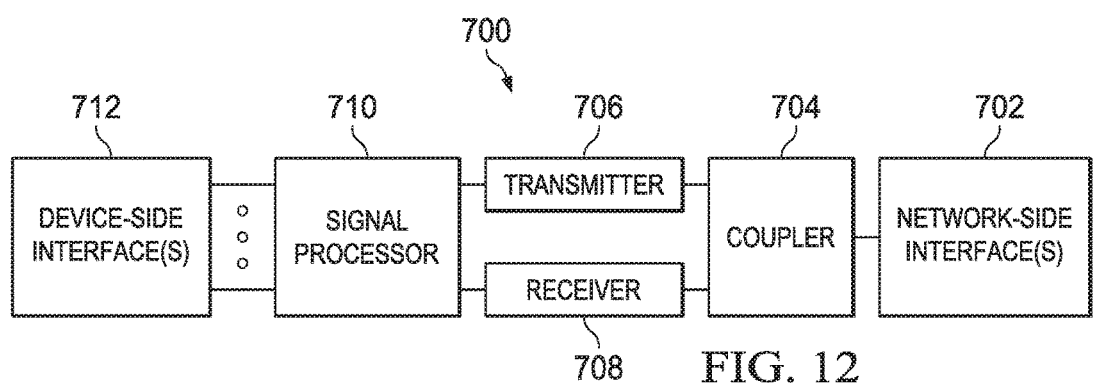
FIG. 12 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 12 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by an edge device, the method comprising:
    determining, by the edge device, a quality of service (QoS) of a direct link between the edge device and a communications controller;
    determining, by the edge device in accordance with the QoS of the direct link between the edge device and the communications controller, a search periodicity of searching for hub devices, the search periodicity being a frequency with which the edge device searches for hub devices; and
    searching, by the edge device, for hub devices in accordance with the search periodicity.

2. The method of claim 1, wherein searching for hub devices comprises detecting a first hub device, wherein the method further comprises:
    determining a QoS of an indirect link through the first hub device; and
    comparing the QoS of the direct link to the QoS of the indirect link to produce a comparison.

3. The method of claim 2, further comprising:
    determining whether to switch from the direct link to the indirect link in accordance with the comparison; and
    switching from the direct link to the indirect link upon determining to switch from the direct link to the indirect link.

4. The method of claim 2, wherein determining the QoS of the indirect link comprises one or more of:
    evaluating transmission power of the edge device for the indirect link;
    determining a bit rate of the indirect link; or
    determining a latency of the indirect link.

5. The method of claim 1, wherein:
    determining the search periodicity in accordance with the QoS of the direct link between the edge device and the communications controller comprises:
        comparing the QoS of the direct link to a first threshold; and
        comparing a likelihood of proximity to a hub device to a second threshold;
    the search periodicity is determined to be a first time period when the QoS of the direct link is determined to exceed the first threshold and the likelihood of proximity to a hub device is determined to not exceed the second threshold; and
    the search periodicity is determined to be a second time period when the QoS of the direct link is determined to exceed the first threshold and the likelihood of proximity to a hub device is determined to exceed the second threshold, the first time period being longer than the second time period.

6. The method of claim 1, wherein determining the QoS of the direct link comprises one or more of:
    evaluating transmission power of the edge device for the direct link;
    determining a bit rate of the direct link; or
    determining a latency of the direct link.

7. The method of claim 1, further comprising determining a likelihood of proximity to a hub device, wherein determining the search periodicity further comprises determining the search periodicity in accordance with the likelihood of proximity to the hub device.

8. The method of claim 1, further comprising:
    transmitting, by the edge device to a network element, a request for the measurement; and
    receiving, by the edge device from the network element, a measurement gap response after transmitting the measurement grant request.

9. The method of claim 8, wherein the request for the measurement gap is a radio resource control (RRC) message.

10. The method of claim 8, further comprising:
determining that a measurement gap has been granted in accordance with the measurement gap response and based thereon:
searching for hub devices during measurement gaps indicated by the measurement gap response.

11. The method of claim 8, wherein determining the search periodicity comprises determining the search periodicity in accordance with the measurement gap response.

12. An edge device comprising:
a memory storage comprising instructions; and
one or more processors in communication with the memory, wherein the one or more processors execute the instructions to:
determine a quality of service (QoS) of a direct link between an edge device and a communications controller,
determine, in accordance with the QoS of the direct link between the edge device and the communications controller, a search periodicity of searching for hub devices, the search periodicity being a frequency with which the edge device searches for hub devices, and
search for hub devices in accordance with the search perms periodicity.

13. The edge device of claim 12, wherein the one or more processors execute the instructions to:
determine a first hub device;
determine a QoS of an indirect link through the first hub device; and
compare the QoS of the direct link to the QoS of the indirect link to produce a comparison.

14. The edge device of claim 13, wherein the one or more processors execute the instructions to:
determine whether to switch from the direct link to the indirect link in accordance with the comparison; and
switch from the direct link to the indirect link upon determining to switch from the direct link to the indirect link.

15. The edge device of claim 13, wherein the one or more processors execute the instructions to determine a QoS of an indirect link through the first hub device by performing operations comprising one or more of:
evaluating transmission power of the edge device for the indirect link;
determining a bit rate of the indirect link; or
determining a latency of the indirect link.

16. The edge device of claim 12, wherein the one or more processors execute the instructions to determine a QoS of a direct link between an edge device and a communications controller by performing operations comprising one or more of:
evaluating transmission power of the edge device for the direct link;
determining a bit rate of the direct link; or
determining a latency of the direct link.

17. The edge device of claim 12, wherein the one or more processors execute the instructions to:
determine a likelihood of proximity to a hub device; and
determine the search periodicity in accordance with the likelihood of proximity to the hub device.

18. The edge device of claim 12, wherein the one or more processors execute the instructions to:
transmit, to a network element, a request for the measurement gap; and
receive, from the network element, a measurement gap response after transmitting the measurement grant request.

19. The edge device of claim 18, wherein the one or more processors execute the instructions to:
determine that a measurement gap has been granted in accordance with the measurement gap response and based thereon:
search for hub devices during measurement gaps indicated by the measurement gap response.

20. The edge device of claim 18, wherein the one or more processors execute the instructions to:
determine the search periodicity in accordance with the measurement gap response.

21. A non-transitory computer readable storage medium storing computer instructions that when executed by one or more processors, cause the one or more processors to:
determine a quality of service (QoS) of a direct link between an edge device and a communications controller;
determine, in accordance with the QoS of the direct link between the edge device and the communications controller, a search periodicity of searching for hub devices, the search periodicity being a frequency with which the edge device searches for hub devices; and
search for hub devices in accordance with the search periodicity.

* * * * *

UNITED STATES PATENT AND TRADEMARK OFFICE
CERTIFICATE OF CORRECTION

PATENT NO. : 10,225,754 B2
APPLICATION NO. : 14/971797
DATED : March 5, 2019
INVENTOR(S) : Nathan Edward Tenny et al.

Page 1 of 1

It is certified that error appears in the above-identified patent and that said Letters Patent is hereby corrected as shown below:

In the Claims

In Column 16, Line 61, Claim 8, delete "for the measurement; and" and insert --for the measurement gap; and--.

In Column 17, Line 25, Claim 12, delete "perms".

Signed and Sealed this
Thirtieth Day of April, 2019

Andrei Iancu
*Director of the United States Patent and Trademark Office*